C. M. MOCK & A. U. GERBER.
SAFETY APPLIANCE FOR RAILWAY CARS.
APPLICATION FILED JAN. 22, 1913.
1,102,784.
Patented July 7, 1914.
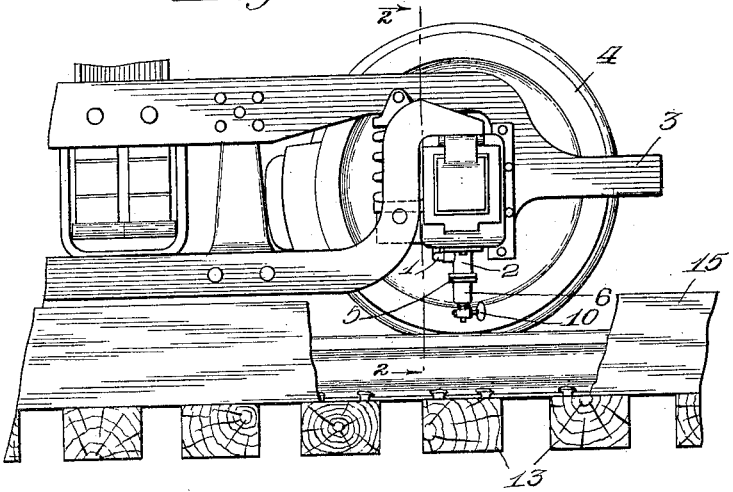
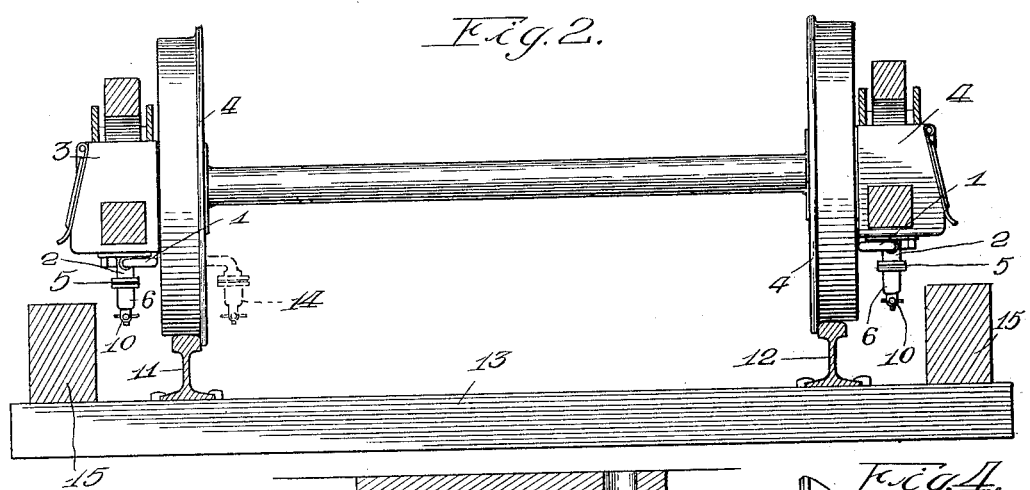
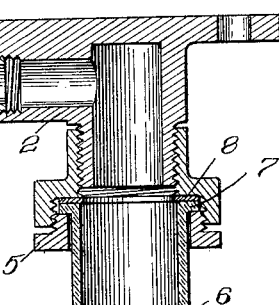
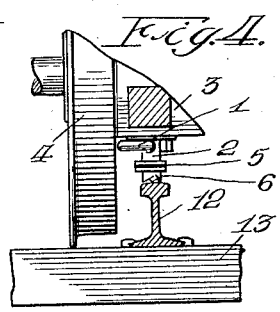

UNITED STATES PATENT OFFICE

CHARLES M. MOCK AND ARTHUR U. GERBER, OF CHICAGO, ILLINOIS.

SAFETY APPLIANCE FOR RAILWAY-CARS.

1,102,784.  Specification of Letters Patent.  Patented July 7, 1914.

Application filed January 22, 1913. Serial No. 743,632.

*To all whom it may concern:*

Be it known that we, CHARLES M. MOCK and ARTHUR U. GERBER, citizens of the United States, residing at Chicago, in the county of Cook and State of Illinois, have invented certain new and useful Improvements in Safety Appliances for Railway-Cars; and we do hereby declare the following to be a full, clear, and exact description of the invention, such as will enable others skilled in the art to which it appertains to make and use the same.

Our invention relates to safety appliances for railway cars, its prime object being to provide a normally sealed outlet or vent adapted when opened to actuate the brake-setting mechanism and positioned where it will be opened by impact with some portion of the track system in case the car is derailed.

Other objects are to provide means for testing the said outlet or vent to see if it is operatively connected to the air-brake equipment of the car, and for draining the outlet of moisture.

We accomplish these objects by the construction shown in the accompanying drawings in which:

Figure —1— is a fragmentary side view of a railway car and of the track adjacent thereto. Fig. —2— is a vertical sectional view through Fig. —1— along the line 2—2. Fig. —3— is an enlarged section of the fragile safety valve shown on the car truck in Fig. —1—. Fig. —4— is a fragmentary vertical section through parts of the car and the track when the car is derailed.

The safety appliance of our invention is particularly applicable to railway cars having brakes normally held out of engagement with the wheels, and adapted to be applied to the wheels by pneumatic mechanism, which mechanism is set in operation when the air pressure is reduced in a brake pipe. In air-brake equipment of this kind it has long been customary to have the brake-actuating mechanism of the various wheels of the car controlled by the reduction of pressure in a single brake pipe. In carrying out our invention, we connect this brake pipe by auxiliary outlet pipes 1 to elbows 2 mounted upon the truck frame 3 at opposite sides of the car, each elbow 2 being outward of, but adjacent to one of the wheels 4 of the car. Threaded to each elbow 2 is a union 5 connecting a clear glass tube 6 to the elbow, this tube having at its upper end a flange 7 adapted to be clamped between the parts of the union 5, the resulting joint between the glass and the union being made air-tight by an elastic gasket 8. The lower end of a tube 6 preferably has a reduced end 9, having a pet-cock 10 fitted thereto, through which cock the interior of the glass tube (and hence of the elbow 2 and auxiliary pipe 1) may be connected with the outer air, thus utilizing the tube as an outlet or vent for the air of the brake pipe. When the fragile tubes 6 are thus mounted, it will be evident from Fig. —1— that they depend laterally of the rails 11 and 12 and that the lower end of each tube (or of the pet-cock 10 carried by the tube) is somewhat above the top of the rails, so as to clear the latter at crossings or switches. Should the car be derailed, one or the other of the opposed wheels 4 will drop between the rails upon the ties 13 close to one of the rails, as in Fig. —4—, thereby lowering the lower end of the tube adjacent to the dropped wheel below the top of the adjacent rail, in doing which the cock 10 will impinge against the said rail to effect a breakage of the fragile tube 6. The air in the tank connected to the outlet pipe 1 and the elbow 2 will escape, and the pneumatically actuated brakes will stop the car. While the fragile safety vent which thus constitutes a seal controlling the outlet for the air of the brake pipe may be positioned inwardly of the rails, as shown by dotted lines at 14 in Fig. —2—, we preferably place this vent or seal outwardly of the wheels, thereby allowing the tube or vent to impinge laterally against the guard rail 15 in case the wheel jumps off the steel rail 12. This outward positioning of the safety member controlling the said outlet has the added advantage of permitting ready access to the same for inspection, so that the manually operable stop-cock may be opened momentarily to drain off any moisture which might have accumulated in the valve (and which otherwise might freeze in wintry weather, thereby breaking the glass), and for testing the outlet or vent to make sure that it has an unobstructed connection with the piping of the air brake equipment. Instead of making the tube 6 of glass, it might be made of other fragile material, but we prefer to use a transparent material for a portion of the member controlling the outlet as it enables the car inspector to tell at a glance if moisture from the air-brake piping has accumulated in the tube or vent. So also, the fragile portion of our safety appliance which is adapted to contact with some portion of the track system to effect an opening of the outlet might be mounted in other than a vertical position, so long as it is placed laterally of one of the rails and at less vertical distance above the top of the rail than the height of the said rail.

Having thus shown and described our invention in an embodiment capable of numerous modifications without departing from its spirit, we claim as new and desire to cover by Letters Patent:

1. A safety appliance for a railway car equipped with an air-brake, comprising an outlet for the air of the air-brake system, and a vent controlling the outlet; the said vent comprising a detachable cup of fragile material, a manually operable valve carried by the said cup; the said valve being disposed in proximity to the track system and adapted upon derailment of the car to contact with a portion of the track system to effect a breakage of the said fragile cup.

2. A safety appliance for a railway car equipped with an air-brake, comprising an outlet for the air of the air-brake system, and a vent controlling the outlet; the said vent comprising a detachable transparent and fragile cup, a threaded coupling for securing the same to a portion of the air-brake system, and a manually operable cock carried by the glass cup; the said cock being disposed in proximity to the track system and adapted upon derailment of the car to contact with a portion of the track system to effect a breakage of the glass cup.

In testimony whereof we have signed our names in presence of two subscribing witnesses.

CHARLES M. MOCK.
ARTHUR U. GERBER.

Witnesses:
ALBERT SCHEIBLE,
E. J. KOCH.

Copies of this patent may be obtained for five cents each, by addressing the "Commissioner of Patents, Washington, D. C."